United States Patent Office 3,755,437
Patented Aug. 28, 1973

3,755,437
**1,3-DISUBSTITUTED-1-UREIDO-1',3'-DISUBSTI-
TUTED-1'-UREIDO SULFIDES**
Melancthon Starr Brown, deceased, by Gustave K. Kohn,
administrator, Berkeley, Calif., assignor to Chevron
Research Company, San Francisco, Calif.
No Drawing. Filed Nov. 9, 1970, Ser. No. 88,212
Int. Cl. C07c 161/00
U.S. Cl. 260—545 R                                 9 Claims

ABSTRACT OF THE DISCLOSURE

Compounds of the formula

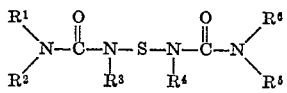

wherein $R^1$ is phenyl optionally substituted with halogen, nitro, alkoxy or alkyl groups, $R^2$, $R^3$ and $R^5$ are hydrogen, or alkyl of 1 to 4 carbon atoms optionally substituted with halogen, $R^4$ is hydrogen; alkyl of 1 to 4 carbon atoms optionally substituted with halogen; phenyl group optionally substituted with halogen, nitro, alkoxy or alkyl groups and $R^6$ is phenyl; phenyl substituted with halogen, nitro, alkoxy or alkyl groups; or alkyl optionally substituted with halogen. The compounds find use as herbicides.

BACKGROUND OF THE INVENTION

Field

The present invention relates to 1,3-disubstituted-1-ureido-1',3'-disubstituted-1'-ureido sulfides. More particularly it relates to the bis-(1,3-disubstituted urea) sulfides and their use as herbicides.

DESCRIPTION OF THE INVENTION

The compounds of the present invention may be represented by the formula

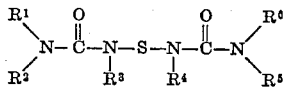

wherein $R^1$ is phenyl or phenyl substituted with 1 to 4 halogen atoms of atomic number 9 to 35 (fluorine, chlorine or bromine), nitro groups, alkoxy groups of 1 to 4 carbon atoms or alkyl groups of 1 to 4 carbon atoms; $R^2$, $R^3$ and $R^5$ are individually hydrogen or alkyl of 1 to 4 carbon atoms or alkyl of 1 to 4 carbon atoms substituted with 1 to 3 halogen atoms of atomic number 9 to 35 (fluorine, chlorine or bromine); $R^4$ is hydrogen, alkyl of 1 to 4 carbon atoms or alkyl of 1 to 4 carbon atoms substituted with 1 to 3, preferably 1 to 2 halogen atoms of atomic number 9 to 35; or phenyl or phenyl substituted with 1 to 4 halogen atoms of atomic number 9 to 35, nitro groups, alkoxy groups of 1 to 4 carbon atoms or alkyl groups of 1 to 4 carbon atoms and $R^6$ is phenyl or phenyl substituted with 1 to 4 halogen atoms of atomic number 9 to 35, nitro groups, alkoxy groups of 1 to 4 carbon atoms or alkyl groups of 1 to 4 carbon atoms.

Preferably $R^1$ and $R^6$ are individually phenyl or phenyl substituted with 1 to 4 halogen atoms of atomic number 9 to 35, nitro groups, alkoxy groups of 1 to 4 carbon atoms or alkyl groups of 1 to 4 carbon atoms; $R^2$ and $R^5$ are individually hydrogen, alkyl of 1 to 4 carbon atoms, alkyl of 1 to 4 carbon atoms substituted with 1 to 3 halogen atoms of atomic number 9 to 35, preferably chlorine or bromine, and $R^3$ and $R^4$ are individually hydrogen, alkyl of 1 to 4 carbon atoms or alkyl of 1 to 4 carbon atoms substituted with 1 to 3 halogen atoms of atomic number 9 to 35, preferably chlorine or bromine.

Still more preferably $R^1$ and $R^6$ will be the same, $R^2$ and $R^5$ will be the same and $R^3$ and $R^4$ will be the same. That is, the bis-sulfides are preferred.

Representative groups which $R^1$ may represent include phenyl, o-fluorophenyl, p-fluorophenyl, m-chlorophenyl, o-methylphenyl, o-bromophenyl, o-methylphenyl, p-ethylphenyl, p-methoxyphenyl, m-butoxyphenyl, p-nitrophenyl and o-nitro-p-methoxyphenyl. The preferred groups for $R^1$ are the halophenyl compounds, particularly fluoro and chlorophenyls, for example o-fluorophenyl, p-fluorophenyl, p-chlorophenyl and m,p-dichlorophenyl.

Representative groups which $R^6$ may represent include in addition to those referred to above for $R^1$, methyl, ethyl, n-propyl, isopropyl, n-butyl, isobutyl, 2-chloroethyl, chloromethyl, 1,2-dichloroethyl. The preferred groups for $R^6$ are the halophenyls and the unsubstituted alkyls, particularly methyl. Of the halophenyls the fluoro and chlorophenyls are particularly preferred.

Representative groups which $R^2$, $R^3$ and $R^5$ may represent include hydrogen, methyl, ethyl, n-propyl, isopropyl, n-butyl, isobutyl, chloromethyl, 2-chloroethyl, 3-chloropropyl, bromomethyl, 2-bromoethyl, etc. The preferred groups for $R^2$, $R^3$ and $R^5$ are hydrogen and unsubstituted alkyl groups of 1 to 4 carbon atoms, particularly methyl.

It is particularly preferred that $R^2$ and $R^5$ are hydrogen and $R^3$ is methyl.

Representative groups which $R^4$ may represent include those groups referred to above for $R^2$, $R^3$ and $R^5$ as well as those referred to for $R^1$. It is particularly preferred that $R^4$ be alkyl of 1 to 4 carbon atoms particularly methyl or the halophenyl groups particularly chlorophenyl such as p-chlorophenyl.

Typical sulfides of the present invention include bis-(3-phenyl-1-ureido) sulfide,
bis-(1-methyl-3-o-fluorophenyl-1-ureido) sulfide,
bis-(1-methyl-3-p-fluorophenyl-1-ureido) sulfide,
bis-(1-methyl-3-m-chlorophenyl-1-ureido) sulfide,
bis-(1-methyl-3-(3,4-dichlorophenyl)-1-ureido) sulfide,
bis-(1-methyl-3-(2,4-dibromophenyl)-1-ureido) sulfide,
bis-(1-methyl-3-o-nitrophenyl-1-ureido) sulfide,
bis-(1-methyl-3-p-methoxyphenyl-1-ureido) sulfide,
bis-(1-methyl-3-m-methylphenyl-1-ureido) sulfide,
bis-(1-methyl-3-(2-nitro-4-methoxyphenyl)-1-ureido) sulfide,
bis-(1-ethyl-3-(2,3,4,5-tetrachlorophenyl)-1-ureido) sulfide,
bis-(1-propyl-3-(3,5-diethoxyphenyl)-1-ureido) sulfide,
bis-(1-chloromethyl-3-methyl-3-o-chlorophenyl-1-ureido) sulfide,
1-methyl-3-p-chlorophenyl-1-ureido-1'-p-chlorophenyl-3'-methyl-1-ureido sulfide,
1-methyl-3-(2,4-difluorophenyl)-1-ureido-1'-(2-nitro-4-methoxyphenyl)-3'-methyl-1'-ureido sulfide and
1-methyl-3-o-chlorophenyl-1-ureido-1'-chloromethyl-3'-ethyl-1-ureido sulfide.

The bis-sulfide compounds of the present invention are made in accordance with the following equation

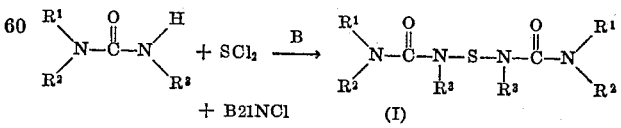

wherein $R^1$, $R^2$ and $R^3$ are as defined previously. It is understood that for the bis-sulfides $R^4$, $R^5$ and $R^6$ may be written as $R^3$, $R^2$ and $R^1$, respectively. B in the above equation is a basic acceptor.

In general, the preparation is accomplished by adding freshly distilled sulfur dichloride to the urea and a basic acceptor such as pyridine or triethylamine in a suitable solvent such as benzene, toluene, a chlorinated hydrocarbon, acetonitrile or dimethoxyethane at a temperature between —20° and the boiling point of the solvent, preferably between 0 and 30° C. The reaction mixture is stirred from 2 to 12 hours. The basic acceptor should be present in stoichiometric amounts to the urea. If a solvent immiscible with water is used, the product obtained is isolated by washing with water, followed by drying and removal of solvent under vacuum or by addition of a nonpolar solvent such as hexane to precipitate the product. If a water miscible solvent is used, the product is isolated by pouring the reaction mixture over ice and filtering.

Unsymmetrical compounds may be prepared by reaction of 1 mole of the urea with $SCl_2$ to produce a ureidosulfenyl chloride which may then be reacted with a different urea to give an unsymmetrical product. Reaction times and conditions, etc. are the same as that for the bis-sulfide compounds.

Also the unsymmetrical compounds may result as a by-product of the preparation of the bis-sulfides. Thus in preparing the bis-sulfides according to Equation I above the sulfur of the sulfur dichloride may bond between the nitrogen having $R^1$ attached thereto of one of the urea molecules with the nitrogen having $R^3$ attached thereto of the other urea molecule according to the following equation

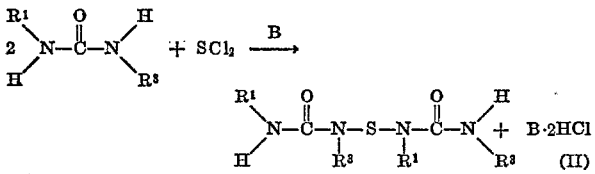

wherein $R^1$, $R^3$ and B are as described above. This reaction will result only when $R^2$ is hydrogen as indicated in Equation II. The bis compound and the unsymmetrical compound may be separated from each other by fractionation, e.g., crystallization, chromatography, etc.

The urea reactant in the above equation may be prepared in situ or beforehand. Conventional methods such as reacting an amine with an isocyanate may be used to prepare this reactant.

The sulfur dichloride should be used in high purity, for example greater than 98% purity. It is frequently desirable to have a small amount of an inhibitor such as tributyl phosphate or triethylphosphate present with the sulfur dichloride, in order to maintain the high purity.

The preparation of the compounds may be more fully understood by reference to the following examples.

EXAMPLE 1

5.6 g. (0.05 mole) of freshly distilled sulfur dichloride in 10 ml. of methylene chloride was added slowly to 16.8 g. (0.1 mole) of 1-methyl-3-o-fluorophenyl urea and 8.5 g. (0.106 mole) of pyridine in 250 ml. of methylene chloride. Solution of the partially dissolved urea was effected. After being stirred 2 hours at room temperature the mixture was washed 2 times with 200 ml. portions of water, dried over magnesium sulfate, followed by removal of solvent under vacuum. The product was chromatographed on 200 g. of silica gel eluting with ether. The crystalline product isolated by chromatography was recrystallized from benzene-hexane giving 5.5 g. of crystals melting at 110–114° C. The compound, bis(1-methyl-3-o-fluorophenyl-1-ureido) sulfide showed elemental analysis as follows:

Calculated (percent): S, 8.75; F, 10.38. Found (percent): S, 8.86; F, 10.72.

An NMR spectrum of the recrystallized material further identified the product.

EXAMPLE 2

5.6 g. (0.05 mole) of sulfur dichloride in 10 ml. of methylene chloride was added to a slurry of 21.9 g. (0.1 mole) of 1-methyl-3-(3,4-dichlorophenyl) urea and 8.5 g. (0.106 mole) of pyridine in 250 ml. of methylene chloride. Solution was effected after being stirred 2 hours.

The yellow solution was added to 200 ml. water causing white solid to come out of the solution. The white solid was collected on a filter and the filtrate worked up to yield more crude product. The filter cake was recrystallized from ethanol yielding 3.7 g. of white crystals of bis-(1-methyl-(3',4'-dichlorophenyl)-1-ureido) sulfide, melting at 188–192° C. The elemental analysis was:

Calculated (percent): S, 6.86; Cl, 30.3. Found (percent): S, 6.45; Cl, 27.87.

EXAMPLE 3

5.6 g. (0.05 mole) of sulfur dichloride in 10 ml. of methylene chloride was added slowly to a flask containing 16.8 g. of 1-methyl-3-p-fluorophenyl urea (0.1 mole) and 8.5 g. of pyridine in 250 ml. of methylene chloride. The resulting green solution was stirred at room temperature for 2 hours, then water-washed twice, dried and stripped. The residue was a thick greenish oil which solidified when cooled. Recrystallization from ethanol in hexane and further washing of the crystals with hexane resulted in 7 g. of bis-(1-methyl-3-p-fluorophenyl-1-ureido) sulfide having a melting point of 123–136° C. and the following elemental analysis:

Calculated (percent): S, 8.77; F, 10.38. Found (percent): S, 8.65; F, 10.3.

EXAMPLE 4

5.6 g. of sulfur dichloride in 10 ml. methylene chloride was added slowly to a slurry of 18.5 g. of 1-methyl-3-p-chlorophenyl urea and 8.5 g. of pyridine in 250 ml. of methylene chloride. The resultant brown solution was stirred at room temperature overnight and was washed twice with 200 ml. of water, dried over magnesium sulfate and stripped of solvent. The product was found to be a mixture of two compounds which when separated by chromatography was identified as (1) bis-(1-methyl-3-p-chlorophenyl-1-ureido) sulfide having a melting point of 191–196° C. and chemical analysis as follows:

Calculated (percent): S, 8.17; Cl, 17.78. Found (percent): S, 8.18; Cl, 18.18.

and (2) 1-methyl-3-p-chlorophenyl-1-ureido-1'-p-chlorophenyl-3'-methyl-1'-ureido sulfide having a melting point of 187–193° C. and a chemical analysis of:

Calculated (percent): S, 8.01; Cl, 17.78. Found (percent): S, 8.04; Cl, 17.76.

UTILITY

The sulfides of the present invention are, in general, herbicidal in both pre- and post-emergence applications. For pre-emergence control of undesirable vegetation these sulfides will be applied in herbicidal quantities to the environment, e.g., soil infested with seeds and/or seedlings of such vegetation. Such application will inhibit the growth of or kill the seeds, germinating seeds and seedlings. For post-emergence applications the sulfides of the present invention will be applied directly to the foliage and other plant parts. Generally they are effective against weed grasses as well as broadleaved weeds. Some may be selective with respect to types of application and/or type of weed.

Pre- and post-emergence herbicidal tests on representative sulfides of this invention were made using the following methods:

Pre-emergence test

An acetone solution of the test sulfides was prepared by mixing 750 mg. sulfide, 220 mg. of a nonionic surfactant and 25 ml. of acetone. This solution was added to approximately 125 ml. of water containing 156 mg. of surfactant.

Seeds of the test vegetation were planted in a pot of soil and the sulfide solution was sprayed uniformly onto the soil surface at a dose of 100 micrograms per cm.². The pot was watered and placed in a greenhouse. The pot was watered intermittently and was observed for seedling emergence, health of emerging seedlings, etc. for a 3-week period. At the end of this period the herbicidal effectiveness of the sulfide was rated based on the physiological observations. A 0 to 100 scale was used; 0 representing no phytotoxicity, 100 representing complete kill.

Post-emergence test

The test sulfide was formulated in the same manner as described above for the pre-emergence test. The concentration of the sulfide in this formulation was 5000 p.p.m. This formulation was uniformly sprayed on 2 replicate pots of 24-day-old plants (approximately 15 to 25 plants per pot) at a dose of 100 micrograms per cm.$^2$. After the plants had dried, they were placed in a greenhouse and then watered intermittently at their bases as needed. The plants were observed periodically for phytotoxic effects and physiological and morphological responses to the treatment. After 3 weeks the herbicidal effectiveness of the sulfide was rated based on these observations. A 0 to 100 scale was used; 0 representing no phytotoxicity, 100 representing complete kill.

The results of these tests appear in the following table.

TABLE

| Compound | Herbicidal effectiveness, pre/post | | | | | |
|---|---|---|---|---|---|---|
| | O | W | C | M | P | L |
| Bis-(-methyl-3-o-fluorophenyl-1-ureido) sulfide | 100/100 | 100/100 | 100/100 | 100/100 | 100/100 | 100/100 |
| Bis-(1-methyl-3-p-fluorophenyl-1-ureido) sulfide | 98/100 | 100/90 | 100/60 | 100/100 | 95/100 | 100/100 |
| Bis-[1-methyl-3-(3,4-dichlorophenyl)-1-ureido] sulfide | | | | 100/100 | 80/100 | 100/100 |
| Bis-(1-methyl-3-p-chlorophenyl-1-ureido) sulfide | 100/— | 100/85 | 100/— | 100/100 | 100/100 | 100/100 |
| 1-methyl-3-p-chlorophenyl-1-ureido-1'-p-chlorophenyl-3'-methyl-1'-ureido sulfide | 100/90 | 99/55 | 98/— | 99/100 | 100/85 | 100/98 |

NOTE.—O=Wild Oats (*Avena fatua*); W=Watergrass (*Echinochloa crusgalli*); C=Crabgrass (*Digitaria sanguinalis*); M=Mustard (*Brassica arvensis*); P=Pigweed (*Amaranthus retroflexus*); L=Lambsquarter (*Chenopodium album*):

The amount of sulfide administered will vary with the particular plant part or plant growth medium which is to be contacted, the general location of application, i.e. sheltered areas such as greenhouses as compared to exposed areas such as field, as well as the desired type of control. For pre-emergent control of most plants dosages in the range of about 0.5 to 20 lbs. per acre will be used. Such administration will give a concentration of about 2 to 80 p.p.m. sulfide distributed throughout 0.1 acre-foot. For post-emergence application, such as foliar spray application, compositions containing about 0.5 to 8 lbs. sulfide per 100 gal. spray will be used. Such application is equivalent to about 0.5 to 20 lbs. sulfide per acre.

The herbicidal compositions of this invention comprise a herbicidal amount of one or more of the above described sulfides intimately admixed with a biologically inert carrier. The carrier may be a liquid diluent such as water or acetone or a solid. The solid may be in the form of dust powder or granules. These compositions will also usually contain adjuvants such as a wetting or dispersing agent to facilitate their penetration into the plant growth media or plant tissue and generally enhance their effectiveness. These compositions may also contain other pesticides, stabilizers, conditioners, fillers and the like.

As will be evident to those skilled in the art, various modifications on this invention can be made or followed, in the light of the foregoing disclosure and discussion, without departing from the spirit or scope of the disclosure or from the scope of the following claims.

What is claimed is:
1. Compound of the formula

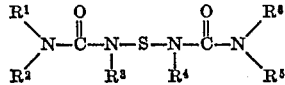

wherein $R^1$ is phenyl; or phenyl substituted with 1 to 2 halogen atoms of atomic number 9 to 35, nitro, alkyl groups of 1 to 4 carbon atoms or alkoxy groups of 1 to 4 carbon atoms; $R^2$ is hydrogen; $R^3$ is alkyl of 1 to 4 carbon atoms; $R^4$ is alkyl of 1 to 4 carbon atoms, phenyl or phenyl substituted with 1 to 4 halogen atoms of atomic number 9 to 35, nitro, alkyl of 1 to 4 carbon atoms or alkoxy of 1 to 4 carbon atoms; $R^5$ is hydrogen; and $R^6$ is alkyl of 1 to 4 carbon atoms; phenyl; or phenyl substituted with 1 to 4 halogens of atomic number 9 to 35, nitro, alkyl groups of 1 to 4 carbon atoms, or alkoxy groups of 1 to 4 carbon atoms.

2. Compound of claim 1 wherein $R^1$ and $R^4$ are phenyl; or phenyl substituted with 1 to 2 halogens of atomic number 9 to 35.

3. Compound of claim 2 wherein $R^3$ and $R^6$ are methyl.

4. Compound of claim 3 wherein $R^1$ and $R^4$ are p-chlorophenyl.

5. Compound of the formula

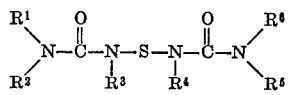

where $R^1$ and $R^6$ are the same and are phenyl; or phenyl substituted with 1 to 4 halogens of atomic number 9 to 35, nitro groups, alkoxy groups of 1 to 4 carbon atoms, or alkyl of 1 to 4 carbon atoms; $R^2$ and $R^5$ are the same and are hydrogen, alkyl of 1 to 4 carbon atoms, or alkyl of 1 to 4 carbon atoms substituted with 1 to 3 halogens of atomic number 9 to 35; and $R^3$ and $R^4$ are the same and are hydrogen, alkyl of 1 to 4 carbon atoms, or alkyl of 1 to 4 carbon atoms substituted with 1 to 3 halogens of atomic number 9 to 35.

6. Compound of claim 5 wherein $R^1$ and $R^6$ are phenyl or phenyl substituted with 1 to 4 halogen atoms of atomic number 9 to 17 (fluorine and chlorine), $R^2$ and $R^5$ are hydrogen and $R^3$ and $R^4$ are methyl.

7. Compound of claim 6 wherein $R^1$ and $R^6$ are 2-fluorophenyl.

8. Compound of claim 6 wherein $R^1$ and $R^6$ are 3,4-dichlorophenyl.

9. The compound of claim 6 wherein $R^1$ and $R^6$ are p-fluorophenyl.

References Cited
UNITED STATES PATENTS
3,202,571   8/1965   Boogant _____ 260—545 X
3,642,890   2/1972   Marviss et al. _____ 260—545 R LORRAINE A. WEINBERGER, Primary Examiner R. GERSTL, Assistant Examiner U.S. Cl. X.R.

71—98

PO-1050
(5/69)

UNITED STATES PATENT OFFICE
CERTIFICATE OF CORRECTION

Patent No. 3,755,437          Dated August 28, 1973

Inventor(s)    MELANCTHON STARR BROWN

It is certified that error appears in the above-identified patent and that said Letters Patent are hereby corrected as shown below:

Col. 2, at line 35 insert --bis-(1-methyl-3-phenyl-1-ureido) sulfide,--

Col. 2, about line 63, "+ B21NCl" should read --+ B·2HCl--.

Signed and sealed this 20th day of August 1974.

(SEAL)
Attest:

McCOY M. GIBSON, JR.          C. MARSHALL DANN
Attesting Officer             Commissioner of Patents